US 8,131,286 B2

(12) United States Patent
Diepstraten et al.

(10) Patent No.: US 8,131,286 B2
(45) Date of Patent: Mar. 6, 2012

(54) TECHNIQUE FOR PROVIDING BROADCAST SERVICES IN A CELLULAR NETWORK

(75) Inventors: Wim J. Diepstraten, Haghorst (NL); Kai R. Kriedte, Woerden (NL); Paul F. Struhsaker, Austin, TX (US); Jaap van der Plas, Nieuwegein (NL)

(73) Assignee: Motorola Mobility, Inc., Libertyville, IL (US)

( * ) Notice: Subject to any disclaimer, the term of this patent is extended or adjusted under 35 U.S.C. 154(b) by 1182 days.

(21) Appl. No.: 11/762,232

(22) Filed: Jun. 13, 2007

(65) Prior Publication Data

US 2008/0311902 A1    Dec. 18, 2008

(51) Int. Cl.
 H04W 4/00    (2009.01)
 H04W 72/00    (2009.01)
(52) U.S. Cl. ............ 455/426.1; 455/450; 370/329
(58) Field of Classification Search ........... 455/422.1, 455/426.1, 450, 464, 552.1, 553.1; 370/329
See application file for complete search history.

(56) References Cited

U.S. PATENT DOCUMENTS

| 4,942,570 | A | 7/1990 | Kotzin et al. | |
|---|---|---|---|---|
| 2004/0203965 | A1* | 10/2004 | Robinson | 455/502 |
| 2008/0198785 | A1* | 8/2008 | Huang et al. | 370/312 |
| 2009/0028258 | A1* | 1/2009 | Ma et al. | 375/260 |
| 2009/0316614 | A1* | 12/2009 | Kim et al. | 370/312 |

FOREIGN PATENT DOCUMENTS

WO    2005078962 A    8/2005

OTHER PUBLICATIONS

PCT International Search Report; Oct. 14, 2008, 4 pages.
"3rd Generation Partnership Project; Technical Specification Group Radio Access Network; Introduction of the Multimedia Broadcast Multicast Service (MBMS) in the Radio Access Network (RAN); Stage 2 (Release 7)" 3GPP TS 25346 v7.4.0, Jun. 1, 2007, pp. 1-64.
"3rd Generation Partnership Project; Technical Specification Groupservices and System Aspects; Multimedia Broadcast/Multicast Service (MBMS); Architecture ADN Functional Description (Release 7)" 3GPP TS 23.246 V7.2.0, Mar. 1, 2007, pp. 1-55, XP002498233.
"Mobile Wimax—Part 1: A Technical Overview and Performance Evaluation" Wimax Forum, Aug. 1, 2006, pp. 1-53, XP002498234.
"The Emerging Standard for Mobile Data Communication," Kornfeld et al., Institute for Communications Technology, EBU Technical Review, Jan. 2005, pp. 1-10.

* cited by examiner

*Primary Examiner* — Michael Thier
(74) *Attorney, Agent, or Firm* — Larson Newman, LLP; Sylvia Chen

(57) ABSTRACT

A technique for providing broadcast services to a subscriber station includes determining (904) when a first broadcast frame that is to be transmitted on a broadcast channel includes broadcast information that is to be received by the subscriber station. Next, cellular information that is included within a first cellular frame and that is to be received by the subscriber station is scheduled (906), based on the determining, to avoid conflict between receipt of the cellular information and the broadcast information at the subscriber station. Finally, based on the scheduling, the first cellular frame is transmitted (908) on a cellular channel.

17 Claims, 7 Drawing Sheets

TECHNIQUE FOR PROVIDING BROADCAST SERVICES IN A CELLULAR NETWORK

FIELD OF THE DISCLOSURE

The present disclosure is generally directed to a cellular network and, more particularly, a technique for providing broadcast services in a cellular network.

BACKGROUND

Various techniques have been proposed to provide broadcast services within a cellular network. For example, multimedia broadcast multicast service (MBMS) is a broadcast service that has been proposed for implementation within Global System for Mobile Communications (GSM) and Universal Mobile Telecommunications System (UMTS) cellular networks. MBMS is split into a bearer service and a user service. The bearer service includes a multicast mode and a broadcast mode, and the user service offers a streaming delivery method and a download delivery method. The streaming delivery method can be used for a continuous transmission, such as mobile television (TV) services, and the download method is intended for download-and-play services. With reference to FIG. 1, a diagram 100 illustrates proposed channel allocations and frame formats for a third generation partnership project (3GPP) cellular network implementing an enhanced MBMS. As is depicted, the cellular network implements a cellular downlink channel 102, operating at a center frequency f1, and a downlink channel 104, operating a center frequency f2.

The downlink channel 102 is divided into high-speed shared control channel (HS-SCCH) timeslots to provide cellular services to subscriber stations. The downlink channel 104 is divided into high-speed physical downlink shared channel (HS-PDSCH) and MBMS timeslots to provide MBMS in conjunction with high-speed downlink packet access (HSDPA). An enhanced MBMS cellular network also implements a cellular uplink channel 106 operating at a center frequency f3. The uplink channel 106 is divided into dedicated physical channel (DPCH) timeslots. While the MBMS timeslots are interleaved with HS-PDSCH timeslots on the downlink channel 104, information delivery on the downlink channel 102 has not been coordinated with information delivery on the downlink channel 104.

Recently, the Institute of Electrical and Electronics Engineers (IEEE) promulgated a standard (i.e., IEEE 802.16) for local and metropolitan area networks. More specifically, IEEE 802.16e describes requirements for an air interface for fixed and mobile broadband wireless access systems. The Worldwide Interoperability for Microwave Access (WiMAX) forum was formed to promote conformance and interoperability of the IEEE 802.16 standard. In general, technology that conforms to the IEEE 802.16 standard facilitates delivery of last mile wireless broadband access, as an alternative to cable and digital subscriber line (DSL) services. IEEE 802.16 defines a multicast and broadcasting service (MBS) that is implemented in a single frequency network (SFN) configuration, as opposed to a multi-frequency network configuration. As is known, a typical cellular network has employed a number of different channels (frequency bands) to reduce interference between neighboring cells of the cellular network and has reused frequency bands in non-adjacent cells.

IEEE 802.16e, which is based on orthogonal frequency division multiple access (OFDMA), defines a partial use of subcarrier (PUSC) operation mode in which a channel is divided into orthogonal segments each with non-overlapping subcarrier permutations and a full use of subcarrier (FUSC) operation mode in which all subcarriers of a channel overlap. IEEE 802.16e defines a zone of a frame to include a number of contiguous OFDMA symbols in an uplink (UL) or downlink (DL) that use the same operation mode. A DL or UL sub-frame may include one or more zones and may switch between the PUSC and FUSC operation modes between zones. In the PUSC operation mode, neighboring base stations (BSs) may be assigned to different segments to reduce interference between the neighboring BSs. In the FUSC operation mode, all BSs are assigned to use the entire channel.

Following the MBS approach, when broadcast services are to be provided in conjunction with cellular services, the broadcast services are provided within a zone (that may employ the PUSC operation mode) of a DL frame. In a cellular network that implements the MBS approach, within the zone, each BS transmits exactly the same broadcast information at exactly the same time, which requires time synchronization of all BSs. Theoretically, because all the BSs are fully synchronized and the broadcast information being transmitted by each of the BSs is identical (i.e., the information and encryption technique are the same), the transmitted signals add constructively, instead of interfering with each other, at a subscriber station. However, the broadcast capacity of MBS is limited by a framing time allocated for the broadcast service. Moreover, implementing MBS and cellular services on the same channel decreases an overall capacity of the channel to provide cellular services, due to the implementation of the broadcast services on the same channel. Furthermore, in cellular networks that employ cells operating at different frequencies, MBS is usually impractical due to limited data rates.

With reference to FIG. 2, a diagram 200 depicts example channel allocation and frame formats for two bases stations (BSs), i.e., BS1 (channel 204) and BS2 (channel 202), that provide broadcast services in a cellular network according to the MBS approach. The base stations BS1 and BS2 both transmit identical broadcast information on the same frequency band (shown separately as channels 204 and 202, respectively) during a zone of a downlink (DL) portion of framing periods 210. As is depicted, during each of the framing periods 210, the base stations BS1 and BS2 transmit a DL having an appropriate DL map (DLmap), an appropriate uplink (UL) map (ULmap), appropriate cellular traffic (CT) and identical broadcast traffic, e.g., in the form of video information (Video 1, Video2 and Video3) in a zone of the DL. Each framing period 210 also includes a UL portion in which a subscriber station (SS) may transmit information to a BS in the cellular network. As is apparent from the diagram 200 of FIG. 2, implementing broadcast services within a cellular network utilizing the MBS approach reduces the bandwidth available for providing cellular traffic, because broadcast services and cellular traffic reside on the same channel.

What is needed is a technique for providing broadband services within a cellular network that does not reduce an available bandwidth of the network for providing cellular traffic. It would also be desirable for the technique to increase broadcast capacity and deployment flexibility.

BRIEF DESCRIPTION OF THE DRAWINGS

The present disclosure may be better understood, and its numerous features and advantages made apparent to those skilled in the art by referencing the accompanying drawings.

DETAILED DESCRIPTION

Figure 1:
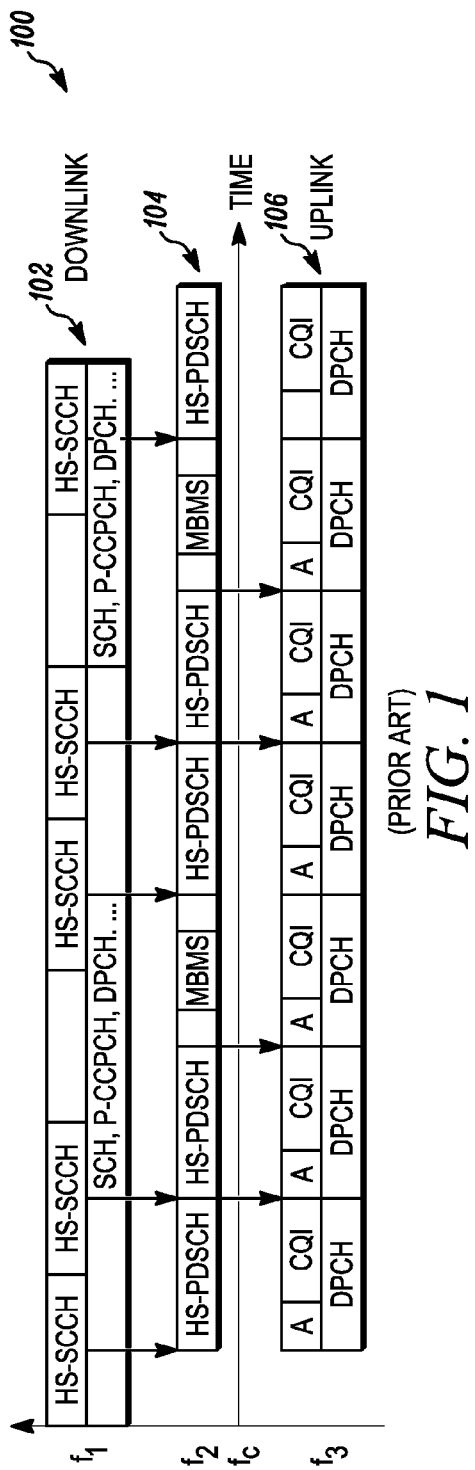
FIG. 1 is a diagram depicting channel allocation and frame formats for a multimedia broadcast multicast service (MBMS), according to the prior art.
Figure 2:
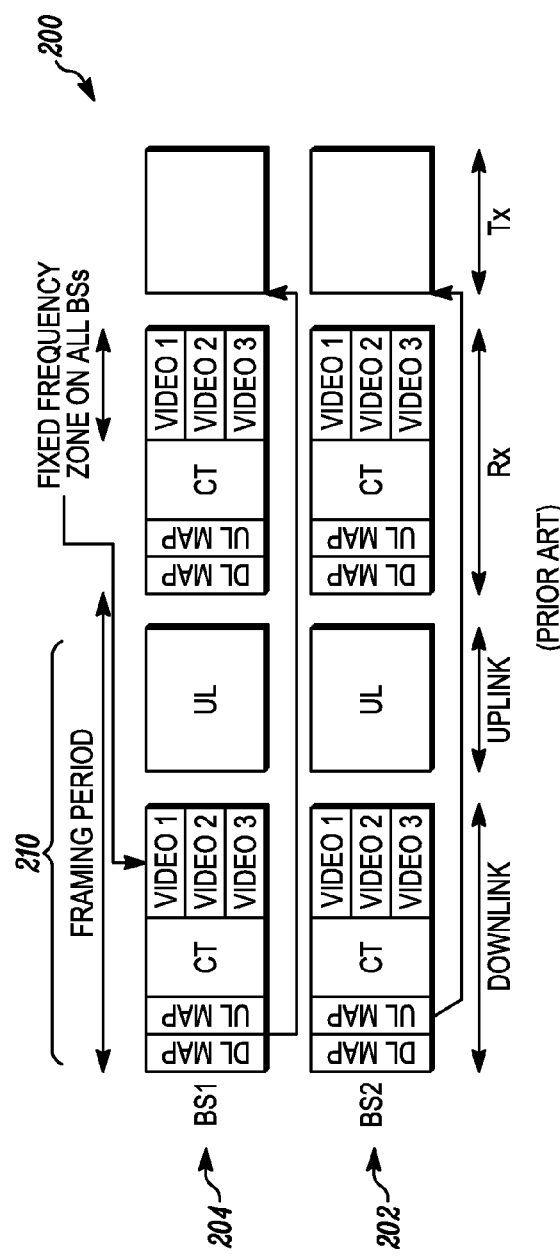
FIG. 2 is a diagram depicting channel allocation and frame formats for a multi-broadcast service (MBS), in accordance with IEEE 802.16e.

According to various aspects of the present disclosure, a flexible technique is disclosed which readily allows broadcast services to be provided in frame-based cellular networks, such as fourth generation (4G) cellular networks. The broadcast services may include, for example, radio and television (TV) services. The broadcast services may be provided to cellular phones, as well as to dedicated wireless equipment configured to receive periodic information and streaming information, such as video and audio information. The techniques described herein are compatible with a single frequency network (SFN) configuration, such as that described in the IEEE 802.16e standard. As is discussed above, the IEEE 802.16 standard provides for allocation of broadcast services in a zone of a downlink sub-frame. In this case, multiple base stations transmit the same broadcast information within the zone of the downlink sub-frame to provide a number of broadcasts on different segments or groups of subcarriers. The MBS configuration, described by the IEEE 802.16e standard, is limited to an SFN where the broadcast service directly impacts cellular capacity. Employing an SFN approach usually allows for a higher data rate because signals from multiple synchronized base stations may be combined, which generally improves a signal to interference ratio (SIR).

According to various aspects of the present disclosure, one or more separate broadcast channels (frequency bands) are implemented to provide broadcast services. In this case, a capacity of a cellular channel of a cellular network is not limited and the provisioning of broadcasting services does not require that the cellular network be limited to a single frequency band. It should be appreciated that a number of enhancements are required to be implemented within a basic cellular network to provide broadcast services using a separate channel, according to various embodiments of the present disclosure.

According to various aspects of the present disclosure, a technique for providing broadcast services to a subscriber station (SS) in a cellular network is implemented using separate channels for the broadcast services and cellular services. As used herein the term "channel" means a band of frequencies over which information is transmitted or received. For example, in a cellular network that implements an orthogonal frequency division multiplexing (OFDM) transmission scheme, the frequency band is divided into a number of subcarriers each of which may carry one or more bits of information, depending upon a modulation scheme (e.g., binary phase shift keying (BPSK), quadrature phase shift keying (QPSK), 16 quadrature amplitude modulation (QAM), 64-QAM, etc.) implemented for the subcarriers. More specifically, a time during which a selected broadcast for the SS is to be transmitted by a broadcast base station (BBS) is communicated to a cellular base station (CBS) to which the SS is communicating. The CBS is then configured to refrain from transmitting cellular traffic allocated for the SS (to the SS) during the time allocated for the SS to receive the selected broadcast, via the broadcast channel. In general, cellular services are provided (in the form of cellular frames) to the SS using a first channel and broadcast services are provided (in the form of broadcast frames) to the SS using a second channel that does not overlap in time with the first channel.

Information associated with the selected broadcast for the SS may be communicated to the CBS responsible for providing cellular service to the SS in a number of ways. For example, the CBS may receive information regarding a selected broadcast for a particular SS from a BBS, from the particular SS, or from another information source (via a wired or wireless connection). According to one or more aspects of the present disclosure, a broadcast frame on a broadcast channel is time synchronized with a cellular frame on a cellular channel. Time synchronization of the broadcast and cellular frames includes aligning beginnings of the frames or providing a time offset between beginnings of the frames. In various embodiments, the SS includes a single receiver that selectively switches between the first and second channels. According to this embodiment, a frame context of the cellular channel may be restored when the SS switches back from the broadcast channel to the cellular channel. In any case, the SS may be a mobile station (MS) or a fixed station.

Figure 6:
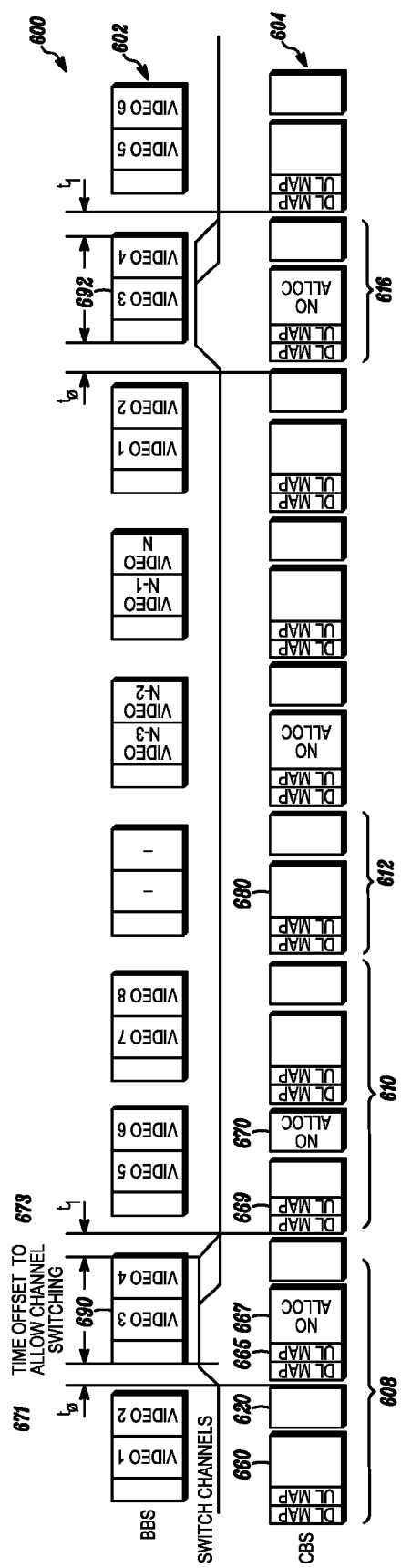
FIG. 6 is an example diagram depicting channel allocations and frame formats of a broadcast channel and a cellular channel that employ a time offset between the channels to facilitate switching between the channels, according to an embodiment of the present disclosure.

In one or more embodiments, a start (beginning) of a cellular frame can be time synchronized with a start (beginning) of a broadcast frame such that the start of the cellular frame is offset in time with the start of a broadcast frame to facilitate switching between the cellular and broadcast channels (see FIG. 6). Multiple broadcasts may be provided within each broadcast frame. Each broadcast frame may include a selected broadcast for a particular SS. Alternatively, a selected broadcast may only be included within one of every N broadcast frames (e.g., a selected broadcast for a specific subscriber may occur in one of every ten broadcast frames). The multiple broadcasts may include audio and video information, e.g., music or TV. In at least one embodiment, the broadcast frame provides a downlink (DL) map to the SS that provides an indication of a location of a selected broadcast within a current or future frame. In one or more embodiments, cyclic prefixes for the broadcast frames and the cellular frames, respectively, are different. It should be appreciated that the DL map for an associated broadcast channel may be transmitted on either or both of the cellular channel and the broadcast channel.

According to another aspect of the present disclosure, a cellular network includes one or more subscriber stations (SSs), one or more cellular base stations (CBSs), and one or more broadcast base stations (BBSs). The CBSs provide cellular services to the SSs on a cellular channel and the BBSs provide broadcast services to the SSs on a broadcast channel. As noted above, a selected broadcast for the SSs is communicated to an appropriate one of the CBSs (i.e., a serving CBS) and the appropriate CBS is configured to not allocate cellular services for a SS on the cellular channel during a time period allocated for the SS to receive the selected broadcast on the broadcast channel. This allows a SS to switch to the broadcast channel without impacting communications on the cellular channel.

According to another aspect of the present disclosure, a SS for a cellular network includes a transmitter and a receiver. The transmitter is configured to selectively transmit information to a CBS associated with the cellular network. The receiver is configured to selectively receive cellular frames on a cellular channel and broadcast frames on a broadcast channel. The cellular frames are provided by the CBS and broadcast frames are provided by a BBS. The SS may be configured to communicate a selected broadcast to at least one of the CBS and the BBS. In any case, the CBS is configured to not allocate the cellular services on the cellular channel during a time period allocated for the SS to receive the broadcast services provided via the broadcast channel. That is, the SS may be configured to communicate to its serving CBS which broadcast service the SS has selected to receive on the broadcast channel. Given that the serving CBS is aware of the time location of the selected broadcast service, the serving CBS has the information to avoid scheduling cellular traffic for the SS during the time that the selected broadcast service is active.

Figure 3:
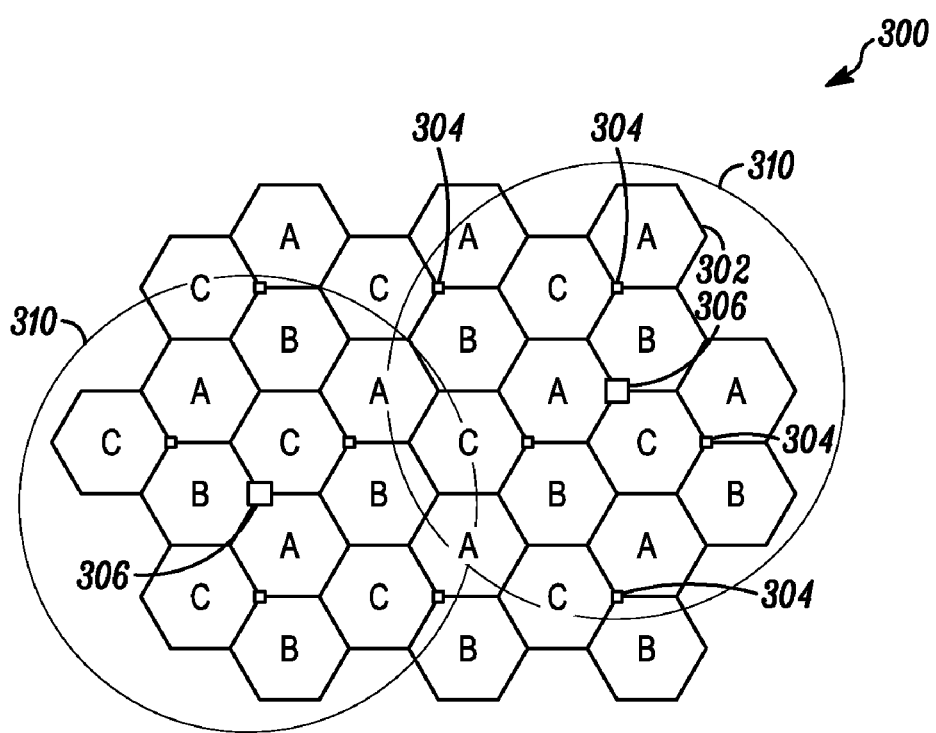
FIG. 3 is an example cellular map for a cellular network that implements cellular base stations (CBSs) for delivering cellular services and broadcast base stations (BBSs) for delivering broadcast services, according to an embodiment of the present disclosure.

Referring to FIG. 3, a cell map 300 for a cellular network, configured according to one or more embodiments of the present disclosure, is depicted. As the broadcast network and the cellular network are fully integrated, all UL communication of the SS associated with a broadcast service may be provided via the cellular network. Assuming that a broadcast channel does not require an uplink, a relatively high-powered transmitter may be implemented at the BBS to transmit a broadcast channel. In general, a high-power transmitter provides a larger coverage area and, as such, a single BBS may be deployed for every N CBSs. For example, a single BBS may be deployed for every five CBSs. In this case, it may be desirable to provide a longer cyclic prefix for a broadcast frame, as compared to a cyclic prefix for a cellular frame, due to the difference in transmission distances. As is shown, the map 300 includes a plurality of cells 302 (labeled A, B, and C) each of which may correspond to one of three different channels or three different segments of a single channel. A BBS 306 is implemented within each broadcast area 310 to provide an omni-directional broadcast signal that includes a plurality of time-division multiplexed (TDM) broadcasts within each broadcast frame.

An SS located within the broadcast area 310 may receive a subscribed broadcast on the broadcast channel, provided by multiple BBSs 306, and cellular service on a cellular channel, provided by one of the CBSs 304. In this example, the CBSs 304 are located to provide cellular coverage for three cells (i.e., cells A, B, and C). As mentioned above, each of the CBSs 304 may provide cellular coverage on three different channels or segments (corresponding to cells A, B, and C) to prevent interference between adjacent cells 302. As noted above, due to the longer RF propagation paths associated with the BBSs 306, it is contemplated that it may be desirable to select a longer cyclic prefix (CP) for a broadcast frame than is utilized for a cellular frame.

Figure 4:
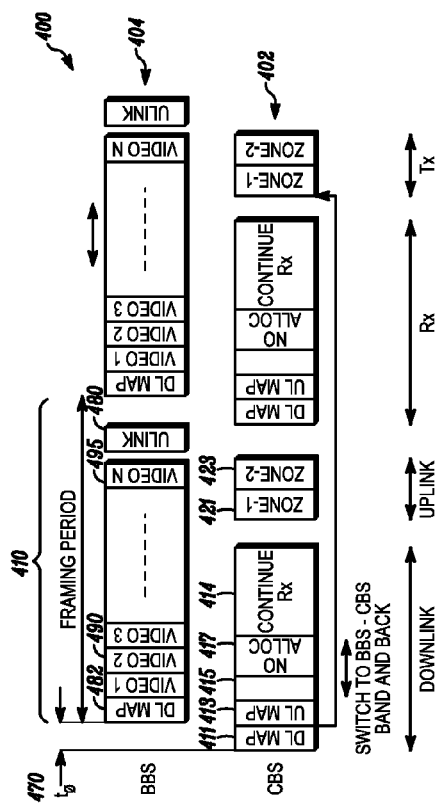
FIG. 4 is an example diagram depicting channel allocation and frame formats for a system implementing separate broadcast and cellular channels, according to an embodiment of the present disclosure.

With reference to FIG. 4, an example diagram 400 depicts channel allocation and frame formats for a cellular channel 402 and a broadcast channel 404, according to an aspect of the present disclosure. As is illustrated in FIG. 4, the cellular channel 402 is offset in time with respect to the broadcast channel 404. The cellular channel 402 provides a downlink (DL) map 411 and an uplink (UL) map 413, during a downlink portion of a framing period 410, to a subscriber station (SS). Following the UL map 413, the SS may receive cellular traffic for a period of time 415. At an allocated time (dependent upon when a selected broadcast is scheduled to be available), the SS switches to the broadcast channel 404 to receive a selected broadcast, i.e., a Video2 signal 490. When switching back to the cellular channel 402, it may be desirable to re-synchronize to allow reception of information based on the original DL map information for the cellular frame without receiving a new preamble. With reference again to the cellular channel 402, during the time that the SS receives the Video2 signal, a cellular base station (CBS) that is providing cellular traffic on the cellular channel 402 ensures that no cellular traffic (no alloc 417) is provided for the SS during that period.

Following completion of the Video2 signal 490, the SS switches to the cellular channel 402 to continue to receive cellular traffic 419 that may be allocated for the SS. As is depicted in FIG. 4, the uplink for the SS includes two zones, i.e., Zone-1 421 and Zone-2 423, which may be provided (in at least some implementations) such that the SS can switch to the uplink without interfering with the selected broadcast provided on the broadcast channel 404 during the uplink portion of the framing period 410. That is, assuming the broadcast channel 404 is providing a selected broadcast in the slot labeled VideoN 495, the SS can transmit uplink information during Zone-1 421 without conflict. It should be appreciated that the uplink may include more than two zones. Typically, depending upon how a selected broadcast is provided within a frame, two zones in the uplink provide adequate bandwidth on the broadcast channel and allow the selected broadcast to be received.

A time offset (t0) 470 may be provided between broadcast frames (on the broadcast channel 404) and cellular frames (on the cellular channel 402) to allow for increased switching times, which typically decreases costs. A relatively small uplink allocation 480 may be provided within the framing period 410 of the broadcast channel 404 for dedicated applications that are only using the broadcast services of the network. Implementing the uplink in the broadcast channel 404 allows an SS that is not in communication with a CBS to receive broadcast services. While only one broadcast channel is shown in FIG. 4, it should be appreciated that multiple broadcast channels may be defined to contain different information, e.g., audio and video information. In a typical case, an SS that wants to receive a broadcast channel can dynamically switch to the allocated channel and switch back to the cellular channel to receive the rest of the downlink frame provided by an associated CBS. As mentioned above, it should be appreciated that a context of a cellular frame, which can include the DL map 411, can be restored when the SS switches from the broadcast channel to the cellular channel within the cellular frame.

It should be appreciated that a number of techniques may be utilized to provide a DL map 482 of a BBS to the SS. For example, the BBS may provide the information to a CBS (that is in communication with the SS) via a back-haul link, which may be a wired or wireless link. Operating the broadcast channel during an uplink of the cellular channel may cause interference with the cellular channel uplink if a BBS is co-located with a CBS. However, providing physical separation between an antenna for the BBS and an antenna for the CBS of at least about one meter usually provides sufficient isolation to make any interference negligible. Physical separation may be utilized in combination with duplex filters, which can be implemented to prevent a receiver from being swamped by a strong transmitter. While overlap between the broadcast channel and an uplink of the cellular channel may be avoided, it should be appreciated that avoiding overlap between the broadcast channel and the cellular channel may, depending upon the implementation, reduce the capacity of the broadcast channel. In general, implementing a multiple zone uplink configuration for a cellular channel allows a SS to receive a selected broadcast on a broadcast channel during a non-utilized portion of the cellular channel uplink without experiencing undesirable interference.

Figure 5:
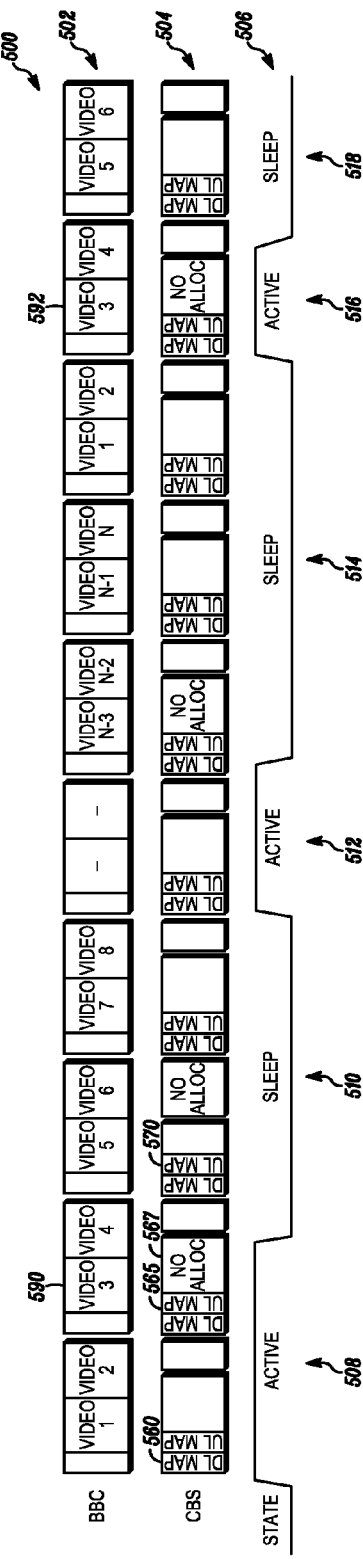
FIG. 5 is an example diagram depicting channel allocations and frame formats of a broadcast channel and a cellular channel in conjunction with associated subscriber station activity, according to another embodiment of the present disclosure.

With reference to FIG. 5, a diagram 500 depicts channel allocation and frame formats for a cellular channel 504 and a broadcast channel 502, as well as a state 506 of an associated subscriber station (SS). In the diagram 500, the cellular channel 504 and the broadcast channel 506 are not offset in time. In this embodiment, a selected broadcast intended for a given SS is not transmitted in each broadcast frame. In a first active period 508, the SS receives cellular traffic 560 on the channel 504. Following receipt of the cellular traffic, the SS receives a selected broadcast (i.e., Video3) 590 on the channel 502. During the time period that the SS receives the selected broadcast on the channel 502, a cellular base station (CBS) that provides the cellular services on the channel 504 is required to not allocate cellular traffic 567 for the SS. In this example, after receiving the selected broadcast on the channel 502, the SS goes to sleep during a first sleep period 510 until additional cellular traffic is provided by the CBS for the SS on the channel 504. An uplink 570 of the first full cellular frame in the first sleep period 510 is unavailable because the UL map 565 in the preceding cellular frame was not received. During a second active state 512, the SS wakes-up to receive cellular traffic on the channel 504. Following the second active state 512, the SS enters a second sleep state 514. During a third active state 516, the SS wakes-up to receive the selected broadcast, e.g., another sub-frame of Video3 592, on the broadcast channel 502.

After receiving the selected broadcast in the third active state 516, the SS enters and remains in a third sleep state 518 until cellular traffic or a next broadcast is received. Thus, as is shown in FIG. 5, an SS receives a selected broadcast, on a broadcast channel, that is interleaved with cellular traffic received on a cellular channel. In this manner, conflicts between broadcast and cellular services provided to the SS are prevented. In this embodiment, a CBS, using prior knowledge, ensures that cellular traffic is not allocated within a frame that overlaps with a selected broadcast. Furthermore, the SS can go to sleep with good efficiency between broadcast frames, depending upon what runs in parallel on the cellular channel.

With reference to FIG. 6, a diagram 600 depicts channel allocation and frame formats for a cellular channel 604 and a broadcast channel 602. In the diagram 600, the cellular channel 604 and the broadcast channel 606 are offset in time. In this embodiment, a selected broadcast intended for a given SS is not transmitted in each broadcast frame, and beginnings of broadcast frames are offset in time with respect to beginnings of cellular frames to reduce switching time requirements between the cellular and broadcast channels. In a first period 608, the SS receives cellular traffic 660 on the channel 604. Following receipt of the cellular traffic 660, the SS receives a selected broadcast (i.e., Video3) 690 on the channel 602. During the time period that the SS receives the selected broadcast on the channel 602, a CBS that provides the cellular services on the channel 604 is required to not allocate cellular traffic 667 for the SS. An uplink 670 of the first full cellular frame in second period 610 is unavailable as the UL map 665 in the preceding cellular frame was not received. During a third period 612, the SS receives cellular traffic 680 on the channel 604. In a fourth period 616, the SS receives the selected broadcast, e.g., another sub-frame of Video3 692, on the broadcast channel 602. In summary, according to the embodiment of FIG. 6, an SS receives a selected broadcast on a broadcast channel that is interleaved with cellular traffic received on a cellular channel. A first time offset t0 between the end of the cellular uplink 620 and the beginning of the broadcast downlink containing the subframe of interest 690 gives the SS time to switch channels. Similarly, a second time offset t1 between the end of the broadcast downlink and the beginning of the next cellular downlink 669 gives the SS time to switch from broadcast channel 602 back to cellular channel 604. In this manner, conflicts between broadcast and cellular services provided to the SS are prevented. In this embodiment, a CBS, using prior knowledge, ensures that cellular traffic is not allocated within a frame that overlaps with a selected broadcast.

Figure 7:
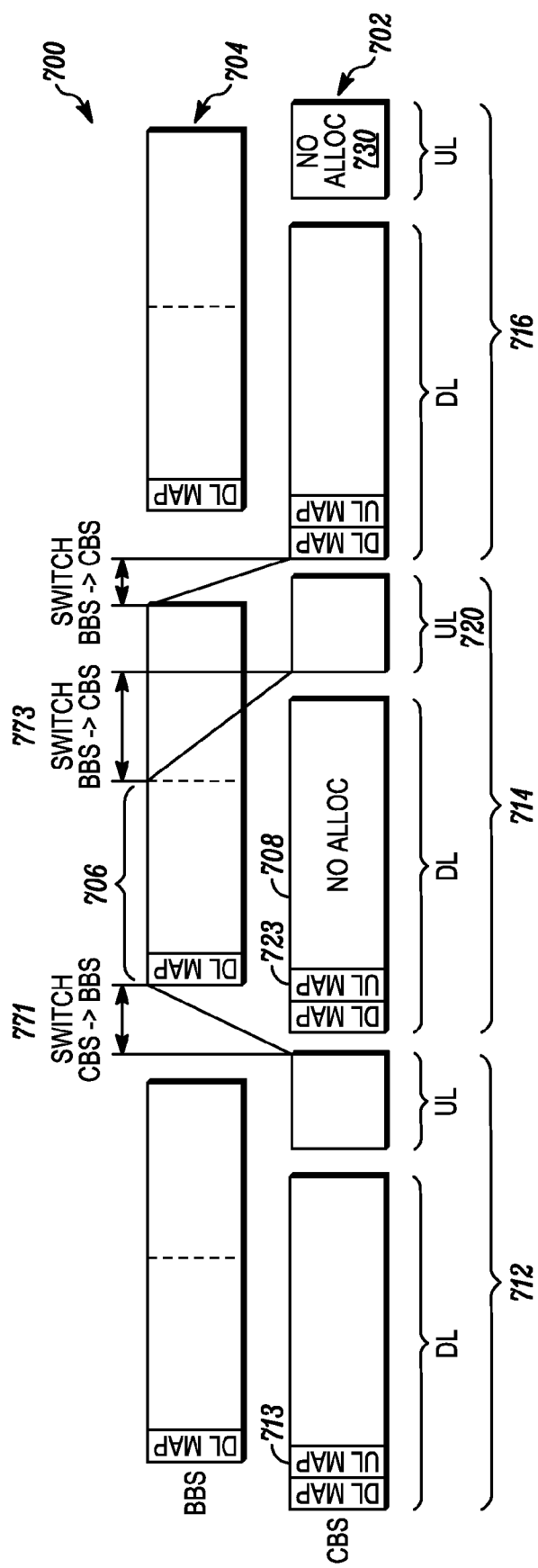
FIG. 7 is another example diagram illustrating various timing information between a broadcast channel and a cellular channel, according to an embodiment of the present disclosure.

Referring to FIG. 7, a diagram 700 illustrates channel allocations and frame formats for a cellular channel 702 and a broadcast channel 704. In the diagram 700, the cellular channel 704 and the broadcast channel 706 are offset in time. The diagram 700 is intended to illustrate that portions of a cellular frame may not be received by an SS due to switching time between the cellular channel 702 and the broadcast channel 704. As noted above, providing a time offset between broadcast frames of a broadcast channel and cellular frames of a cellular channel allows for longer radio frequency (RF) switching times, which generally lowers the cost of a subscriber station (SS). In the implementation shown in FIG. 7, a SS receives broadcast services on the broadcast channel 704 during period 706. Due to SS switching from the cellular channel 702 to the broadcast channel 704, a downlink 708 of cellular frame 714 is not received by the SS. The switching time 771 from the cellular channel 702 to the broadcast channel 704 causes a first portion of the DL 708 to be missed and the switching time 773 from the broadcast channel 704 to the cellular channel 702 causes the latter portion of the DL 708 to be missed. Because frame 712 provides a UL map 713 for frame 714, a UL 720 of frame 714 is useable. However, due to the fact that a downlink of cellular frame 714 provides a UL map 723 for cellular frame 716, a UL 730 of frame 716 cannot be utilized.

It should be appreciated that in order to provide the broadcast services described herein each CBS is required to acquire knowledge of what service a particular SS has subscribed. In this manner, a scheduler of a CBS has knowledge of where traffic should not be allocated for the particular SS. The DL map associated with the broadcast services may be provided by a CBS, such that an SS is not required to receive a DL map from the BBS. In any event, it should be appreciated that SSs do not need to receive a DL map of the broadcast services during every frame. Furthermore, it should be appreciated that the DL map of the broadcast channel may be provided to the SS in virtually any desired format. As previously discussed, in at least some implementations (e.g., FIG. 4) it is generally desirable to implement multiple zones within an uplink of the cellular channel in order to better utilize the bandwidth of the broadcast channel. In this manner, broadcast channels can be received even when the broadcast channel of interest has some overlap with a portion of the uplink of the cellular channel. It should be appreciated that the information transmitted on the broadcast channel may implement a number of different modulation schemes, such as quadrature amplitude modulation (QAM) and quadrature phase shift keying (QPSK). Usually, a capacity of a SFN based broadcast channel is greater than a non-SFN based broadcast channel due to the fact that signals provided by multiple BBSs in an SFN add constructively at an SS. In general, a required bandwidth for a broadband service is dependent upon a targeted display resolution. In sum, the diagrams of FIGS. 4-7 are included to illustrate various items that require consideration in the design of a communication system that employs the various techniques disclosed herein.

Figure 8:
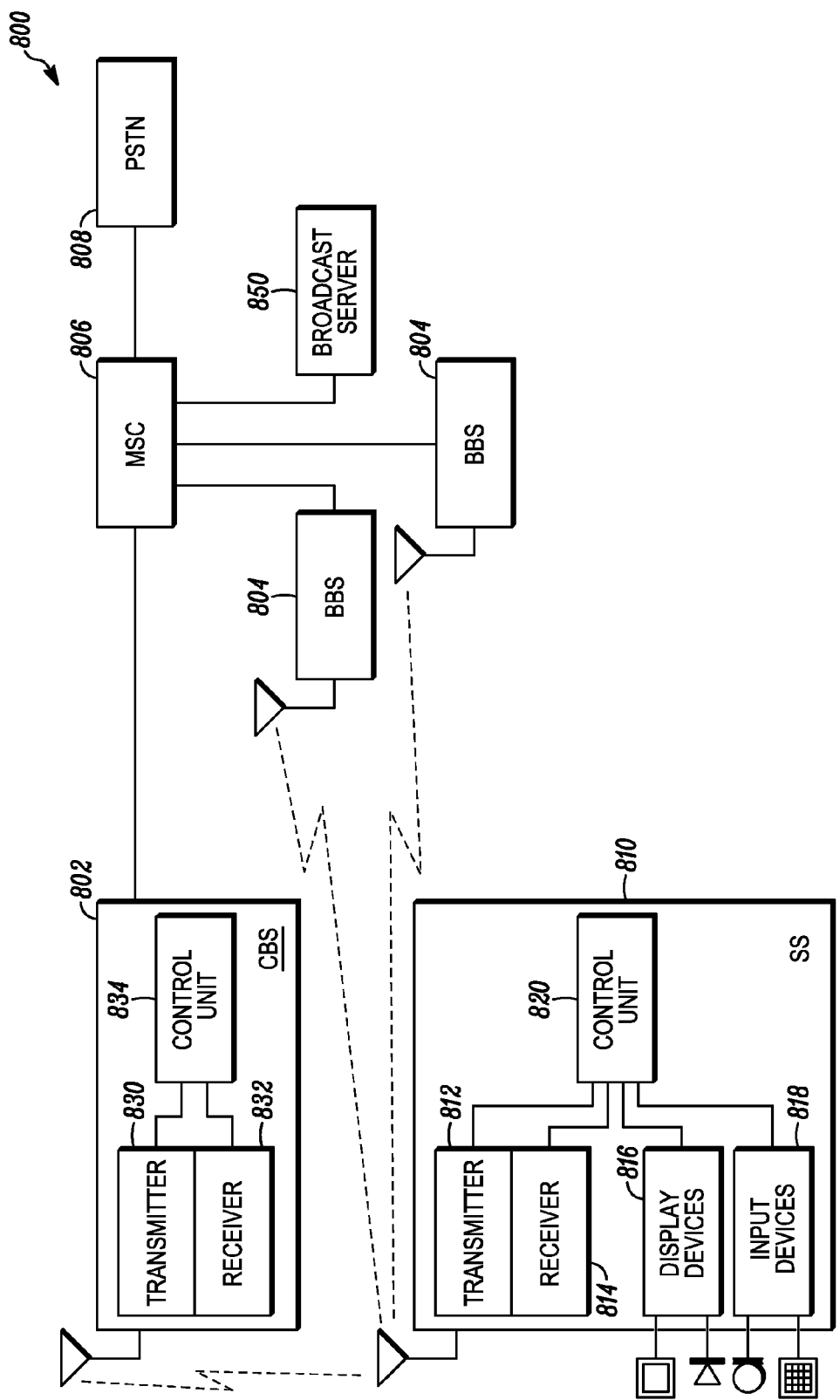
FIG. 8 is a block diagram of a relevant portion of an example cellular network.

Turning to FIG. 8, a relevant portion of an example cellular network 800 is depicted that may be configured according to various embodiments of the present disclosure. The network 800 includes a subscriber station (SS) 810 that is in communication with a cellular base station (CBS) 802 and one or more broadcast base stations (BBSs) 804. The CBS 802 and the BBSs 804 are in communication with a mobile switching center 806, which can be connected to a public switch telephone network (PSTN) 808. The BBSs 804 may receive broadcast information from a broadcast server 850, via the MSC 806, or via another path. The SS 810 includes a transmitter 812 and a receiver 814, which may be included within a single transceiver. A control unit 820 is connected to and controls the transmitter 812 and the receiver 814. Additionally, the control unit 820 is connected to output devices 816 (such as a display and a speaker) and input devices 818 (such as a keypad and microphone). Similarly, the CBS 802 includes a transmitter 830 and a receiver 832, which may be included within a single transceiver. A control unit 834 is connected to and controls the transmitter 830 and the receiver 832. Depending upon the implementation, the SS 810 may receive both cellular services and broadcast services on different channels using the same receiver. In this case, the CBS 802 is configured to not allocate cellular traffic for the SS 810 when the SS 810 is receiving subscribed broadcast information from the BBS 804. Alternatively, the SS 810 may be configured to only receive broadcast services or cellular services.

Figure 9:
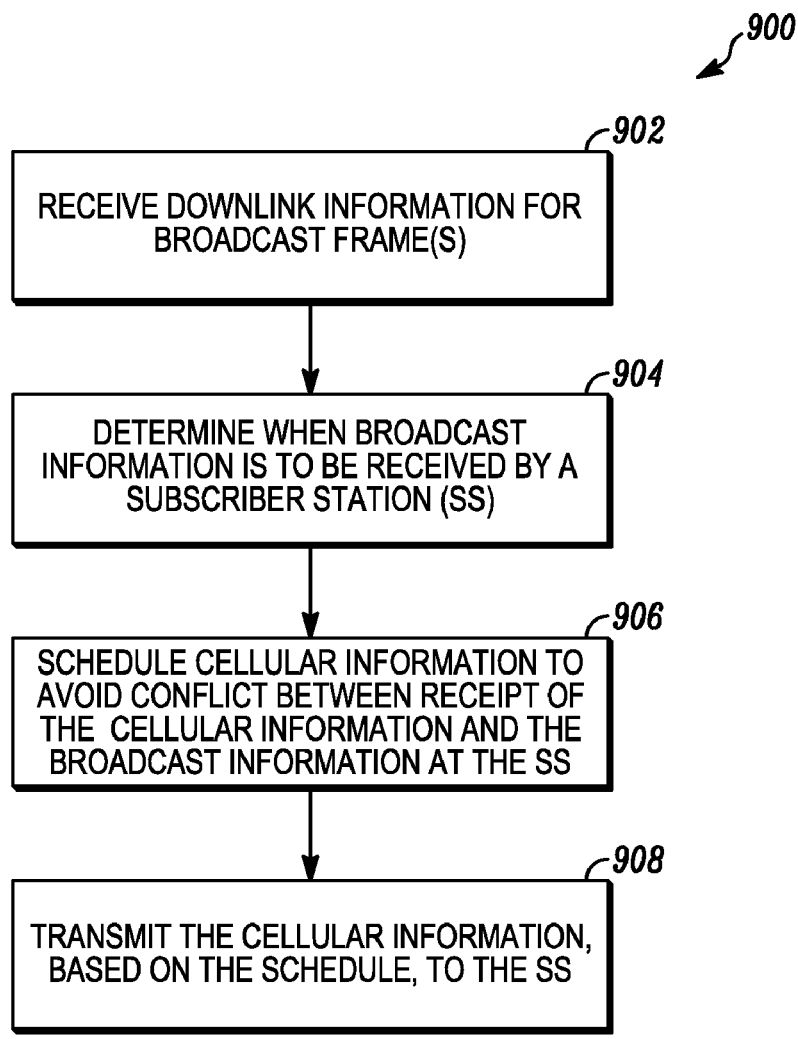
FIG. 9 is a flow diagram of an example process for providing broadcast services and cellular services to a subscriber station.

FIG. 9 depicts an example flow diagram for an example process 900 that runs on a CBS to provide broadcast services and cellular services according to various aspects of the present disclosure. In block 902, a CBS receives downlink information for broadcast frames. The downlink information identifies a location of broadcast information in a broadcast frame (and may be configured to indicate what broadcast service is located in each broadcast frame) and may be included within a broadcast DL map, or provided in another portion of a downlink. The downlink information may also include subscriber specific information that indicates what broadcast information a given subscriber has selected. Next, in block 904, the CBS determines when broadcast information is to be received by a given SS. Then, in block 906, the CBS schedules cellular information for the SS to avoid conflict between receipt of the cellular information (on a cellular channel) and the broadcast information (on a broadcast channel) at the SS. That is, the CBS schedules the cellular information such that it is not received at the SS during a time period allocated for the SS to receive the broadcast information. In addition, the CBS adjusts its uplink scheduling for the SS accordingly. Finally, in block 908, the CBS transmits cellular information to the SS based on the schedule.

Much of the inventive functionality and many of the inventive principles are best implemented with or in software programs or instructions and integrated circuits (ICs), such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present disclosure, further discussion of such software and ICs, if any, will be limited to the essentials with respect to the principles and concepts within the various embodiments.

It will be appreciated that the methods and the wireless devices described herein may include one or more conventional processors and unique stored program instructions that control the one or more processors, to implement, in conjunction with certain non-processor circuits, some of the functions of the electronic device described herein. The non-processor circuits may include, but are not limited to, a radio receiver, a radio transmitter, signal drivers, clock circuits, power source circuits, and user input devices.

In this document, relational terms such as "first" and "second", and the like, may be used solely to distinguish one entity or action from another entity or action without necessarily requiring or implying any actual such relationship or order between such entities or actions. The terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

The term "another", as used herein, is defined as at least a second or more. The terms "including", "having", or any variation thereof, as used herein, are defined as comprising. The term "coupled", as used herein is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, an executable application, an applet, a servlet, a source code, an object code, a shared library/dynamic load library and/or other sequence of instructions designed for execution on a computer system.

Accordingly, techniques have been described herein that allow for implementing flexible broadcast services within a cellular environment. The broadcast services may include radio, TV, etc.

What is claimed is:

1. A method, comprising:
   determining when, within a first broadcast frame that is to be transmitted on a broadcast channel in a first frequency band, the first broadcast frame includes a first time period for transmitting broadcast information that is to be received by a particular subscriber station;
   scheduling cellular information that is included within a first cellular frame during a second time period, and that is to be received by the particular subscriber station, to avoid conflict between receipt of the cellular information during the second time period and the broadcast information during the first time period at the particular subscriber station, wherein the scheduling is based on the determining; and transmitting, based on the scheduling, the first cellular frame on a cellular channel in a second frequency band, wherein at least a portion of the first cellular frame, when transmitted, overlaps in time with the first broadcast frame.

2. The method of claim 1, further comprising:
receiving downlink information identifying a location-in-time of the broadcast information within the first broadcast frame.

3. The method of claim 2, wherein the receiving further comprises:
receiving, from a broadcast base station, the downlink information identifying the first time period of the broadcast information within the first broadcast frame.

4. The method of claim 1, wherein a plurality of broadcast frames, including the first broadcast frame, to be transmitted on the broadcast channel are time synchronized with a plurality of cellular frames, including the first cellular frame, to be transmitted on the cellular channel.

5. The method of claim 1, further comprising:
transmitting downlink information for the first broadcast frame to the particular subscriber station on the broadcast channel, the downlink information identifying a location-in-time of the broadcast information within the first broadcast frame.

6. The method of claim 1, wherein the scheduling further comprises:
coordinating transmission of the cellular information during the second time period so that the cellular information is not transmitted simultaneously with the broadcast information during the first time period, wherein the first broadcast frame is time synchronized with the first cellular frame, and wherein a beginning of the first broadcast frame is offset in time with respect to a beginning of the first cellular frame.

7. The method of claim 1, wherein the first broadcast frame is included within a broadcast frame stream that includes regularly spaced additional broadcast frames each of which includes additional broadcast information associated with the broadcast information of the first broadcast frame.

8. The method of claim 7, wherein the first cellular frame is included within a cellular frame stream that includes additional cellular frames at least one of which includes additional cellular information for the particular subscriber station, and wherein the additional cellular information is scheduled to not overlap in time with the additional broadcast information.

9. A cellular base station, comprising:
receiver configured to receive downlink information that identifies a location-in-time of broadcast information for a particular subscriber station as being during a first time period within a first broadcast frame that is to be transmitted on a broadcast channel; and
a transmitter configured to transmit a first cellular frame on a cellular channel, the first cellular frame configured to include cellular information for the particular subscriber station during a second time period within the first cellular frame, the transmitter configured to transmit the first cellular frame to avoid simultaneous transmission of the cellular information during the second time period and the broadcast information during the first time period to the particular subscriber station, wherein the first broadcast frame is configured to be time synchronized with the first cellular frame and wherein at least a portion of the first cellular frame, when transmitted, overlaps in time with the first broadcast frame.

10. The cellular base station of claim 9, wherein the cellular base station is further configured to transmit the downlink information for the first broadcast frame to the particular subscriber station on the cellular channel.

11. A method, comprising:
receiving, at a particular subscriber station, a first cellular frame on a first channel, the first cellular frame including cellular information for the particular subscriber station during a first time period; and
receiving, at the particular subscriber station, a first broadcast frame on a second channel, the first broadcast frame including broadcast information for the particular subscriber station during a second time period, the first broadcast frame being time synchronized with the first cellular frame, wherein at least a portion of the first cellular frame overlaps in time with the first broadcast frame and wherein the broadcast information during the second time period and the cellular information during the first time period are received by a first receiver of the particular subscriber station during non-overlapping time periods.

12. The method of claim 11, further comprising:
receiving, at the particular subscriber station, downlink information for the first broadcast frame, the downlink information identifying a location-in-time of the broadcast information within the first broadcast frame.

13. The method of claim 11, wherein the receiving, at a particular subscriber station, a first cellular frame on a first channel further comprises:
receiving, from a cellular base station, the first cellular frame on the first channel, the first cellular frame having a first cyclic prefix with a first length; and
wherein the receiving, at the particular subscriber station, a first broadcast frame on a second channel further comprises:
receiving, from the broadcast base station, the first broadcast frame on the second channel, the first broadcast frame having a second cyclic prefix with a second length, wherein the second length is longer than the first length.

14. The method of claim 11, further comprising:
configuring the first receiver to receive the first channel prior to receiving the first cellular frame; and
configuring the first receiver to receive the second channel prior to receiving the broadcast information during the second time period in the first broadcast frame.

15. The method of claim 14, further comprising:
configuring the first receiver to receive the first channel after receiving the broadcast information during the second time period in the first broadcast frame.

16. The method of claim 11, further comprising:
receiving, at the particular subscriber station, a second broadcast frame on the second channel that includes additional broadcast information for the particular subscriber station.

17. The method of claim 16, wherein the additional broadcast information includes video or audio information.

* * * * *